United States Patent
Zhao et al.

(10) Patent No.: US 11,334,769 B2
(45) Date of Patent: May 17, 2022

(54) MIXUP IMAGE CAPTIONING

(71) Applicant: International Business Machines Corporation, Armonk, NY (US)

(72) Inventors: Shiwan Zhao, Beijing (CN); Yi Ke Wu, Beijing (CN); Hao Kai Zhang, Harbin (CN); Zhong Su, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 86 days.

(21) Appl. No.: 16/922,367

(22) Filed: Jul. 7, 2020

(65) Prior Publication Data
US 2022/0012544 A1   Jan. 13, 2022

(51) Int. Cl.
*G06K 9/62* (2022.01)
*G06F 16/55* (2019.01)
*G06N 3/08* (2006.01)

(52) U.S. Cl.
CPC ........... *G06K 9/6267* (2013.01); *G06F 16/55* (2019.01); *G06K 9/629* (2013.01); *G06K 9/6256* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 2018/0143966 A1* | 5/2018 | Lu | G06F 40/169 |
| 2018/0144208 A1* | 5/2018 | Lu | G06K 9/6271 |
| 2018/0144248 A1* | 5/2018 | Lu | G06F 40/30 |
| 2019/0286931 A1 | 9/2019 | Kim | |

FOREIGN PATENT DOCUMENTS

WO    2017151757 A1    9/2017

OTHER PUBLICATIONS

Specia et al., "A Shared Task on Multimodal Machine Translation and Crosslingual Image Description", Proceedings of the First Conference on Machine Translation, vol. 2: Shared Task Papers, pp. 543-553, Berlin, Germany, Aug. 11-12, 2016, © 2016 Association for Computational Linguistics.
(Continued)

*Primary Examiner* — Leon Flores
(74) *Attorney, Agent, or Firm* — Randy E. Tejeda (57) ABSTRACT

In an approach to augmenting caption datasets, one or more computer processors sample a ratio lambda from a probability distribution based on a pair of datapoints contained in a dataset, wherein each datapoint in the pair of datapoints comprises an image and an associated caption; extend the dataset by generating one or more new datapoints based on the sampled ratio lambda for each pair of datapoints in the dataset, wherein the sampled ratio lambda incorporates an interpolation of features associated with the pair of datapoints into the generated one or more new datapoints; identify one or more objects contained within a subsequent image utilizing an image model trained utilizing the extended dataset; generate a subsequent caption for one or more identified objects contained within the subsequent image utilizing a language generating model trained utilizing the extended dataset.

17 Claims, 4 Drawing Sheets

(56) References Cited

OTHER PUBLICATIONS

Miyazaki et al., "Cross-Lingual Image Caption Generation", Proceedings of the 54th Annual Meeting of the Association for Computational Linguistics, pp. 1780-1790, Berlin, Germany, Aug. 7-12, 2016. © 2016 Association for Computational Linguistics.

Yun et al., "CutMix: Regularization Strategy to Train Strong Classifiers with Localizable Features", arXiv:1905.04899v1 [cs.CV] May 13, 2019, 14 pages.

Aldabbas et al., "Data Augmentation to Stabilize Image Caption Generation Models in Deep Learning" International Journal of Advanced Computer Science and Applications, vol. 10, No. 10, 2019, 9 pages.

Takahashi et al., "Data Augmentation using Random Image Cropping and Patching for Deep CNNs", Journal of Latex Class Files, vol. 14, No. 8, Aug. 2015, arXiv:1811.09030v2 [cs.CV] Aug. 27, 2019, 16 pages.

Liu et al., "Generating Diverse and Descriptive Image Captions Using Visual Paraphrases", Printed Jun. 17, 2020, 10 pages.

Jaffe, Alan, "Generating Image Descriptions using Multilingual Data", Proceedings of the Conference on Machine Translation (WMT), vol. 2: Shared Task Papers, pp. 458-464, Copenhagen, Denmark, Sep. 7-11, 2017, © 2017 Association for Computational Linguistics.

Dong et al., "I2T2I: Learning text to image synthesis with textual data augmentation", arXiv:1703.06676v3 [cs.CV] Jun. 3, 2017, 6 pages.

Wang et al., "Image Captioning with Deep Bidirectional LSTMs", ©2016 ACM. ISBN 978-1-4503-3603-Jan. 16, 2010, embedarXiv:1604.00790v3 [cs.CV] Jul. 20, 2016, 11 pages, <http://dx.doi.org/10.1145/2964284.2964299>.

Summers et al., "Improved Mixed-Example Data Augmentation", arXiv:1805.11272v2 [cs.CV] Jun. 1, 2018, 7 pages.

Wu et al., "Improving Captioning for Low-Resource Languages By Cycle Consistency", arXiv: 1908.07810v1 [cs.CL] Aug. 21, 2019, 6 pages.

Cui et al., "Learning to Evaluate Image Captioning", Printed Jun. 17, 2020, 9 pages.

Shokri et al., "Membership Inference Attacks Against Machine Learning Models", arXiv: 1610.05820v2 [cs.CR] Mar. 31, 2017, 16 pages.

Feng et al., "Unsupervised Image Captioning", arXiv:1811.10787v2 [cs.CV] Apr. 6, 2019, 10 pages.

Kim et al., "Variational Autoencoder-Based Multiple Image Captioning Using a Caption Attention Map", Appl. Sci. 2019, 9, 2699; doi:10.3390/app9132699, 12 pages, <http://www.mdpi.com/journal/applsci>.

Vincent et al., "Extracting and Composing Robust Features with Denoising Autoencoders", Appearing in Proceedings of the 25th International Confer-ence on Machine Learning, Helsinki, Finland, 2008, Copy-right 2008 by the author(s)/owner(s), 3 pages.

Vinyals et al., "Show and Tell: Neural Image Caption Generator", arXiv:1411.4555v2 [cs.CV] Apr. 20, 2015, 9 pages.

Wang et al., "Image Captioning with Deep Bidirectional LSTMs and Multi-Task Learning", Apr. 2018, 3 pages, <https://doi.org/10.1145/3115432>.

Appendix P—List of IBM Patents or Patent Applications Treated as Related, Filed herewith, 2 Pages.

Zhao et al., "Denoising Autoencoder Image Captioning" Filed herewith, 25 pages.

Zhao et al., "Adaptive Cycle Consistency Multimodal Image Captioning", Filed herewith, 29 pages.

Zhang et al., "Bag of Freebies for Training Object Detection Neural Networks", Apr. 12, 2019, arXiv:1902.04103v3 [cs.CV], 9 pages.

Zhang et al., "mixup: Beyond Empirical Risk Minimization", Published as a conference paper at ICLR 2018, Apr. 27, 2018, arXiv:1710.09412v2 [cs.LG], 13 pages.

\* cited by examiner

|          | BLEU-4 | METEOR | CIDEr |
|----------|--------|--------|-------|
| Baseline | 19.17  | 18.01  | 38.39 |
| Mixup | 20.07 | 18.35 | 42.01 |

MIXUP IMAGE CAPTIONING

BACKGROUND

The present invention relates generally to the field of machine learning, and more particularly to image captioning.

Image captioning is the process of generating textual description of an image.

Deep learning is a branch of machine learning based on a set of algorithms that model high-level abstractions in data by using model architectures, with complex structures or otherwise, often composed of multiple non-linear transformations. Deep learning is part of a broader family of machine learning methods based on learning representations of data. An observation (e.g., an image) can be represented in many ways such as a vector of intensity values per pixel, or in a more abstract way as a set of edges, regions of particular shape, etc. Some representations make it easier to learn tasks (e.g., facial expression recognition) from examples. Deep learning algorithms often use a cascade of many layers of nonlinear processing units for feature extraction and transformation. Each successive layer uses the output from the previous layer as input. The algorithms may be supervised or unsupervised, and applications include pattern analysis (unsupervised) and classification (supervised).

Neural networks (NNs) are computing systems inspired by biological neural networks. NNs are not simply algorithms, but rather a framework for many different machine learning algorithms to work together and process complex data inputs. Such systems learn to perform tasks by considering examples, generally without being programmed with any task-specific rules. For example, in image recognition, NNs learn to identify images that contain cats by analyzing example images that are correctly labeled as true or false (e.g., cat or not cat) and using the results to identify objects (e.g., cats) in other images. In this example, NNs classify without any prior knowledge about cats, for example, that cats have fur, tails, whiskers, and pointy ears. Instead, NNs automatically generate identifying characteristics from the learning material. NNs are based on a collection of connected units or nodes called artificial neurons, which loosely model the neurons in a biological brain where each connection, like the synapses in a biological brain, can transmit a signal from one artificial neuron to another. An artificial neuron that receives a signal can process the signal and then transfer the signal to additional artificial neurons.

In common NN implementations, the signal at a connection between artificial neurons is a real number, and the output of each artificial neuron is computed by some non-linear function of the sum of its inputs. The connections between artificial neurons are called edges. Artificial neurons and edges typically have a weight that adjusts as learning proceeds. The weight increases or decreases the strength of the signal at a connection. Artificial neurons may have a threshold such that the signal is only sent if the aggregate signal crosses that threshold. Typically, artificial neurons are aggregated into layers. Different layers may perform different kinds of transformations on their inputs. Signals travel from the first layer (the input layer), to the last layer (the output layer), possibly after traversing the layers multiple times.

Convolutional neural networks (CNN) are a class of neural networks, most commonly applied to analyzing visual imagery. CNNs are regularized versions of a multi-layer perceptron (e.g., fully connected network), where each neuron in one layer is connected to all neurons in the next layer. CNNs take advantage of the hierarchical pattern in data and assemble more complex patterns using smaller and simpler patterns. CNNs break down images into small patches (e.g., 5×5 pixel patch), then moves across the image by a designated stride length. Therefore, on the scale of connectedness and complexity, CNNs are on the lower extreme as CNNs use relatively little pre-processing compared to other image classification algorithms, allowing the network to learn the filters that in traditional algorithms were hand-engineered.

SUMMARY

Embodiments of the present invention disclose a computer-implemented method, a computer program product, and a system for augmenting caption datasets utilizing convex combination pairs of examples and associated labels. The computer-implemented method includes one or more computer processors sampling a ratio lambda from a probability distribution based on a pair of datapoints contained in a dataset, wherein each datapoint in the pair of datapoints comprises an image and an associated caption. The one or more computer processors extend the dataset by generating one or more new datapoints based on the sampled ratio lambda for each pair of datapoints in the dataset, wherein the sampled ratio lambda incorporates an interpolation of features associated with the pair of datapoints into the generated one or more new datapoints. The one or more computer processors identify one or more objects contained within a subsequent image utilizing an image model trained utilizing the extended dataset. The one or more computer processors generate a subsequent caption for one or more identified objects contained within the subsequent image utilizing a language generating model trained utilizing the extended dataset.

DETAILED DESCRIPTION

Traditionally, automatic image caption generation is a crucial and challenging task, demanding both effective visual recognition and linguistic interpretation. Image caption generation models require substantial amounts of training data (e.g., exponentially increasing with problem complexity) to ensure model accuracy and precision dependent on number of classes, number of input features, and number of model parameters. Frequently said models assume there is sufficient training data, but in practice, there are many instances and situations where required training data is unavailable or prohibitively expensive. This issue is sufficiently expounded in captioning tasks with regards to uncommon languages or languages with limited training sets. Generally, a well-trained model should allow for generalization using training data to any subsequent data from a problem domain. Models trained with insufficient training data do not generalize and suffer from low accuracy and precision due to overfitting and underfitting. The cost of creating and maintaining a caption dataset is substantially higher than that of standard classification dataset, since annotating an image with a caption involves more complex cognitive and inferential efforts. Said cost is substantially increased for infrequently utilized or uncommon languages where dataset scales are especially limited leading to poor performing image captioning systems.

Embodiments of the present invention provide solutions that lower costs related to captured and maintain a caption dataset and improves the performance of image captioning systems. Specifically, embodiments of the prevent invention select a plurality of datapoint pairs included in a dataset and sample a ratio lambda from a beta distribution representing the selected pair (i.e., convex combination) of image and caption datapoints. Embodiments of the present invention augment a training dataset by generating a plurality of image and associated captions utilizing a sampled ratio based on a plurality of pair datapoints. Embodiment of the present invention utilize incorporated linear interpolation of feature vectors associated with a pair of datapoints to generate new training images and captions. Embodiments of the present invention reduce training requirements of a model by augmenting the caption dataset with a plurality of generated images and captions. Embodiments of the present invention increases the performance of captioning models and reduces the resources expended in collecting and maintaining a caption dataset. Implementation of embodiments of the invention may take a variety of forms, and exemplary implementation details are discussed subsequently with reference to the Figures.

The present invention will now be described in detail with reference to the Figures.

Figure 1:
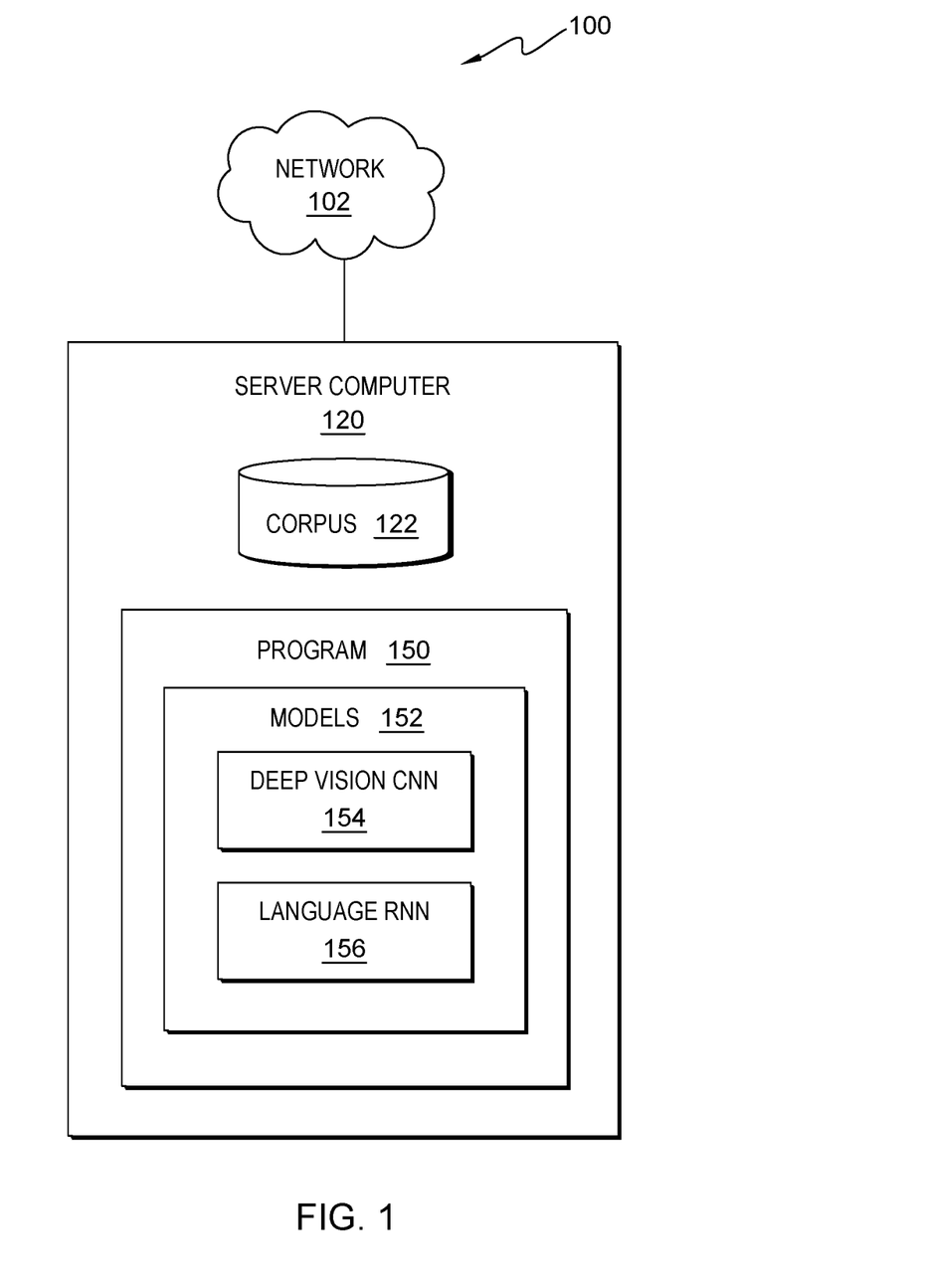
FIG. 1 is a functional block diagram illustrating a computational environment, in accordance with an embodiment of the present invention.

FIG. 1 is a functional block diagram illustrating a computational environment, generally designated 100, in accordance with one embodiment of the present invention. The term "computational" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computational environment 100 includes server computer 120 connected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between server computer 120, and other computing devices (not shown) within computational environment 100. In various embodiments, network 102 operates locally via wired, wireless, or optical connections and can be any combination of connections and protocols (e.g., personal area network (PAN), near field communication (NFC), laser, infrared, ultrasonic, etc.).

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with other computing devices (not shown) within computational environment 100 via network 102. In another embodiment, server computer 120 represents a computing system utilizing clustered computers and components (e.g., database server computers, application server computers, etc.) that act as a single pool of seamless resources when accessed within computational environment 100. In the depicted embodiment, server computer 120 includes corpus 122 and program 150. In other embodiments, server computer 120 may contain other applications, databases, programs, etc. which have not been depicted in computational environment 100. Server computer 120 may include internal and external hardware components, as depicted and described in further detail with respect to FIG. 4.

Corpus 122 is a repository for data used by program 150. In the depicted embodiment, corpus 122 resides on server computer 120. In another embodiment, corpus 122 may reside elsewhere within computational environment 100 provided program 150 has access to corpus 122. In an embodiment, corpus 122 is a database comprising an organized collection of data. Corpus 122 can be implemented with any type of storage device capable of storing data and configuration files that can be accessed and utilized by program 150, such as a database server, a hard disk drive, or a flash memory. In an embodiment, corpus 122 stores data used by program 150, such as datasets, data points, sets of training data (i.e., training data), data structures, and/or variables used to fit the parameters or hyperparameters of a model. In an embodiment, corpus 122 may contain one or more sets comprising a plurality of classified data (i.e., captions (i.e., natural language textual representations of identified objects)), hereinafter referred to as datapoints (e.g., training statements) or a dataset (e.g., training set). In another embodiment, a dataset contains an array of training statements organized in labelled training sets. For example, a dataset includes a plurality of images of fruit and associated captions that describe the fruit identified in respective images. In a further embodiment, corpus 122 contains vectorized (i.e., one-hot encoding, dimension reduced, etc.) images and associated captions.

Models 152 is representative of a captioning model utilizing machine learning algorithms and/or deep learning models. In an embodiment, models 152 is comprised of any combination of machine learning and deep learning techniques and algorithms (e.g., binary classifiers, decision trees, Naive Bayes classification, support vector machines for classification problems, random forest for classification and regression, linear regression, least squares regression, logistic regression). In the depicted embodiment, models 152 utilizes transferrable neural networks algorithms and models (e.g., recurrent neural network (RNN), long short-term memory (LSTM), deep stacking network (DSN), deep belief network (DBN), convolutional neural networks (CNN), compound hierarchical deep models, etc.) trained with supervised methods. In the depicted embodiment, models 152 contain deep vision CNN 154 and language RNN 156. Here, deep vision CNN 154 is a CNN trained and utilize to identify/classify one or more objects within one or more images based on a plurality of features. In another embodiment, program 150 utilizes deep vision CNN 154 to assess an image by considering different features, available as structured or unstructured data, and applying relative numerical weights. In an embodiment, language RNN 156 is an RNN utilized to generate one or more natural language captions representing the objects identified by deep vision CNN 154. The training of models 152 is depicted and described in further detail with respect to FIG. 2.

Program 150 is a program for augmenting caption datasets. In various embodiments, program 150 may implement the following steps: sample a ratio lambda from a probability distribution based on a pair of datapoints contained in a dataset, wherein each datapoint in the pair of datapoints comprises an image and an associated caption; extend the dataset by generating one or more new datapoints based on the sampled ratio lambda for each pair of datapoints in the dataset, wherein the sampled ratio lambda incorporates an interpolation of features associated with the pair of datapoints into the generated one or more new datapoints; identify one or more objects contained within a subsequent image utilizing an image model trained utilizing the extended dataset; generate a subsequent caption for one or more identified objects contained within the subsequent image utilizing a language generating model trained utilizing the extended dataset. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In various embodiments, client versions of program 150 resides on any other computing device (not depicted) within computational environment 100. Program 150 is depicted and described in further detail with respect to FIG. 2.

The present invention may contain various accessible data sources, such as corpus 122, that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

Figure 2:
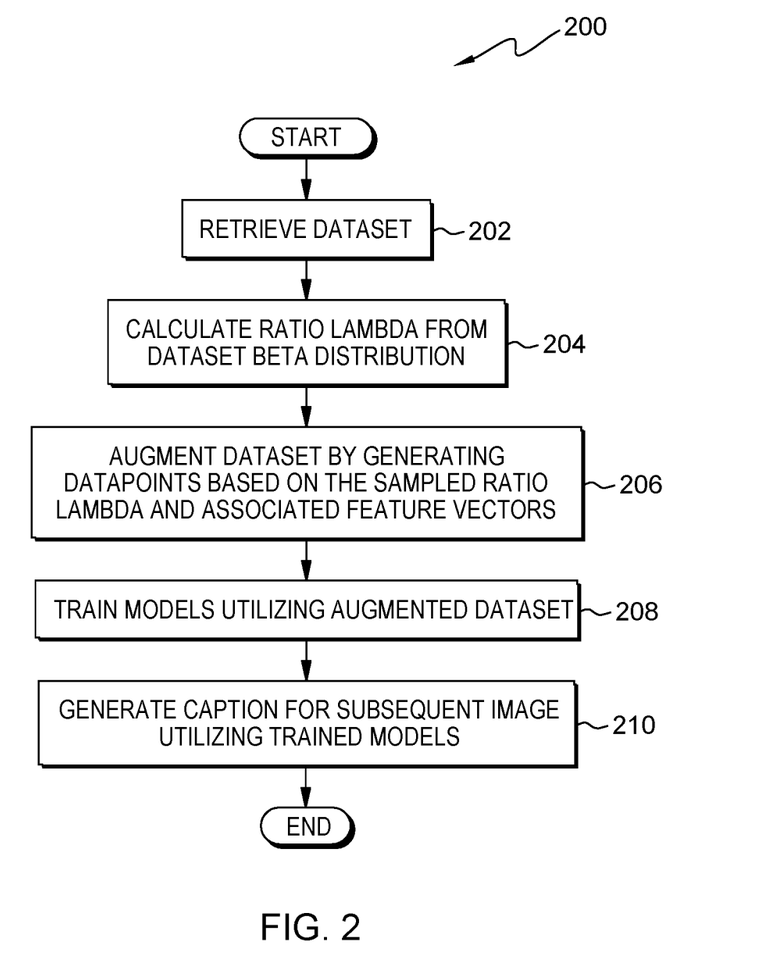
FIG. 2 is a flowchart depicting operational steps of a program, on a server computer within the computational environment of FIG. 1, for augmenting caption datasets, in accordance with an embodiment of the present invention.

FIG. 2 is a flowchart depicting operational steps of program 150 for augmenting caption datasets, in accordance with an embodiment of the present invention.

Program 150 retrieves a dataset (step 202). In an embodiment, program 150 initiates responsive to a detected corpus, a subsequent image captioning request, or by user request (e.g., user inputs training set). In another embodiment, program 150 initiates when detecting or receiving dataset or one or more training sets. Here, the dataset contains a plurality of datapoints wherein each datapoint comprises an image and associated caption. In various embodiments, program 150 retrieves the dataset from corpus 122. In another embodiment, program 150 retrieves a dataset a plurality of sources, such as a publicly available external source, and stores said information within corpus 122. For example, program 150 retrieves a set of captioned images from an online image repository. Responsive to program 150 receiving or retrieving the dataset, program 150 creates a plurality of subsets from the dataset where each subset contains a distinct pairing of datapoints (e.g., images, associated captions, and feature sets).

Program 150 calculates a sampled ratio lambda from a probability distribution (step 204). Program 150 calculates a probability distribution representing a created subset of datapoints, as described in step 202. In an embodiment, program 150 the calculated probability distribution is a beta distribution defined on the interval [0, 1] representing one or more random variable exponents contained in the created subset. In an embodiment, program 150 calculates (i.e., samples) a sample ratio ($\lambda$) utilizing the calculated beta distributions for each distinct pair of datapoints (i.e., pair of images and respective captions) and associated feature vectors. In another embodiment, program 150 samples multiple ratios utilizing multiple aggregated pairs of images and respective captions.

Program 150 augments the dataset by generating one or more datapoints based on the calculated sampled ratio lambda and associated feature vectors (step 206). Program 150 augments (i.e., extends) the dataset retrieved in step 202 and sampled in step 204, by generating a plurality of new image and caption pairs utilizing the calculated ratios and the corresponding probability distribution (i.e., beta distribution). In an embodiment, program 150 determines the scale (e.g., dataset quality) of the dataset (i.e., caption dataset) by calculating the number of image instances and number of captions for each image. In an embodiment, program 150 generates a new image and caption pairs by incorporating the prior knowledge that linear interpolations of feature vectors lead to linear interpolations (e.g., mixup function) of the associated targets (i.e., new image and caption pairs). In an embodiment, program 150 utilizes the following as a mixup function:

$$\tilde{x} = \lambda x_i + (1-\lambda)x_j \quad (1)$$

$$\tilde{y} = \lambda y_i + (1-\lambda)y_j \quad (2)$$

With respect to equations (1) and (2), is a new image, $\tilde{y}$ is a new caption, x is an image matrix, y is a caption (i.e., natural language), and $\lambda \sim B(\alpha, \alpha)$, as calculated in step 204. In various embodiments, program 150 utilizes equations (1) and (2) to generate a plurality of new interpolated images and associated captions. In this embodiment, program 150 selects an original pair of datapoints (i.e., a first image and first caption; and a second image and second caption) from the dataset. Responsively, program 150 utilizes the sampled ratio from step 204 to exchange features of the first and second images, forming a third image consisting of the interpolated features (e.g., pixel locations, identified objects, edges, color, etc.) of the first and second images. Concurrently, program 150 utilizes the sampled ratio from step 204 to exchange features of the first and second captions, forming a new caption consisting of a natural language mixup of the first and second captions. In an embodiment, program 150 associates the new caption with the new image, thus creating a new image and caption pair. In an embodiment, program 150 augments (i.e., extends, expands, curates, etc.) the original dataset with a plurality of generated datapoints. In another embodiment, program 150 utilizes traditional augmentation procedures, such as color jittering, scale modifications, cropping, rotations, aspect ratio distortions, and flips, to further augment the dataset by adjusting generated pairs, thus creating another plurality of image and caption pairs. In another embodiment, program 150 creates a plurality of new complex captions utilizing a single word mixup process where each word in a caption sentence (e.g., chain of captions, set of identified objects, etc.) is considered a distinct caption and mixed with a corresponding paired caption on word by word basis. For example, a first caption sentence comprises five words and each word is mixed with a second caption sentence.

Program 150 trains models utilizing augment dataset (step 208). In an embodiment, program 150 creates, initializes, and trains one or more models (e.g., models 152) utilizing the augmented dataset, as described in step 206. In an embodiment, program 150 initializes one or more models with randomly generated weights. In an alternative embodiment, program 150 initializes the one or more models with weights calculated from a preprocessing function such as tf-idf. In yet another embodiment, program 150 performs supervised training with the labeled vectorized data (i.e., image and caption pairs). For example, program 150 feeds image and caption pairs into one or more models, allowing program 150 to make inferences between the problem data (e.g., images) and the solution data (i.e., captions). In the depicted embodiment, program 150 creates, initializes, and trains a deep vision convolutional neural network (e.g., deep vision CNN 154) with the augmented dataset. In this embodiment, program 150 utilizes the trained CNN to identify objects and classify images based on inferences learned from the augmented dataset. In the depicted embodiment, program 150 creates, initializes, and trains a language generating recurrent neural network (e.g., language RNN 156) with the augmented dataset. In this embodiment, program 150 utilizes the trained RNN to generate natural language captions representing one or more identified objects contained in an image.

Program 150 generates a caption for a subsequent image utilizing trained models (step 210). In embodiment, program 150 utilizes the trained CNN (e.g., deep vision CNN 154) to identify objects and classify images based on inferences learned from the augmented dataset. In another embodiment, program 150 utilizes the trained RNN (e.g., language RNN 156) to generate a caption for a subsequent inputted image with identified objects. In this embodiment, program 150 constructs one or more words, chains, and/or sentences containing natural language representations of the image and identified objects. In one embodiment, program 150 generates a series of captions and associated probabilities, where said probabilities denote the chance that the predicted word is the next word in a sequence. In an embodiment, program 150 selects the most probable word (e.g., the word with the highest attached probability). In another embodiment, program 150 prompts the user with the top (e.g., highest probability) predicted words and allows the user to select the next word. In an embodiment, responsive to user feedback and/or newly generated images and captions, program 150 adds the generated image and associated caption to the augmented dataset and retrains one or more associated models.

In an embodiment, program 150 deploys one or more trained models to a production environment or server. In various embodiments, program 150 may select multiple ranked models and deploy the models to the same production environment or deploy the models to a plurality of respective production, test, or auxiliary environments. In another embodiment, program 150 selected a deployment environment to deploy one or more trained models out of a plurality of deployment environments (e.g., test, production, backup server, containers, or virtual machines). In an embodiment, the user instructs program 150 to deploy a specific model.

Figure 3:
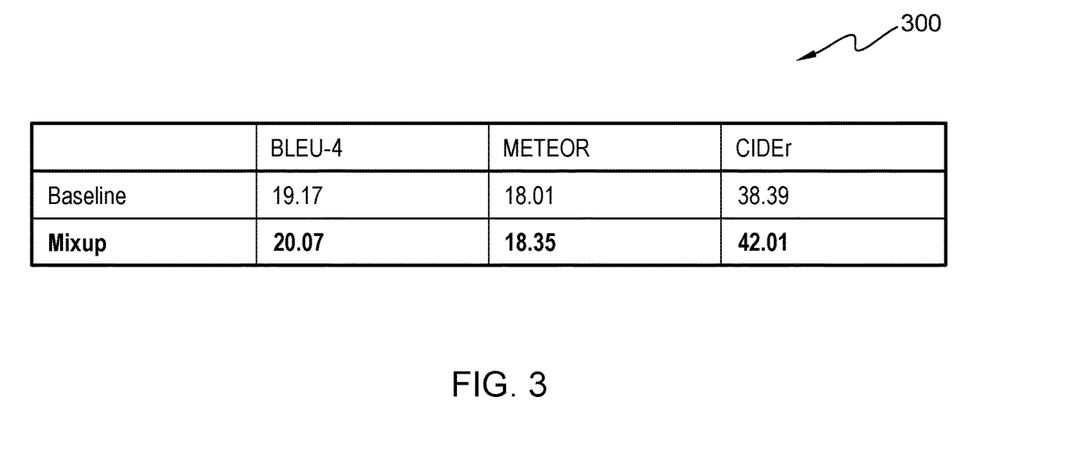
FIG. 3 depicts an exemplary table, in accordance with an embodiment of the present invention.

FIG. 3 depicts chart 300, in accordance with an illustrative embodiment of the present invention. Chart 300 contains testing results from a plurality of machine learning benchmark such as bilingual evaluation understudy (BLEU-4), metric for evaluation of translation with explicit ordering (METEOR), consensus-based image description evaluation (CIDEr), each evaluating a plurality of models trained with a baseline dataset and an augmented dataset, as described in step 206. Chart 300 demonstrates that model evaluations, as described above, are significantly increased when utilizing an augmented dataset, as described in step 208.

Figure 4:
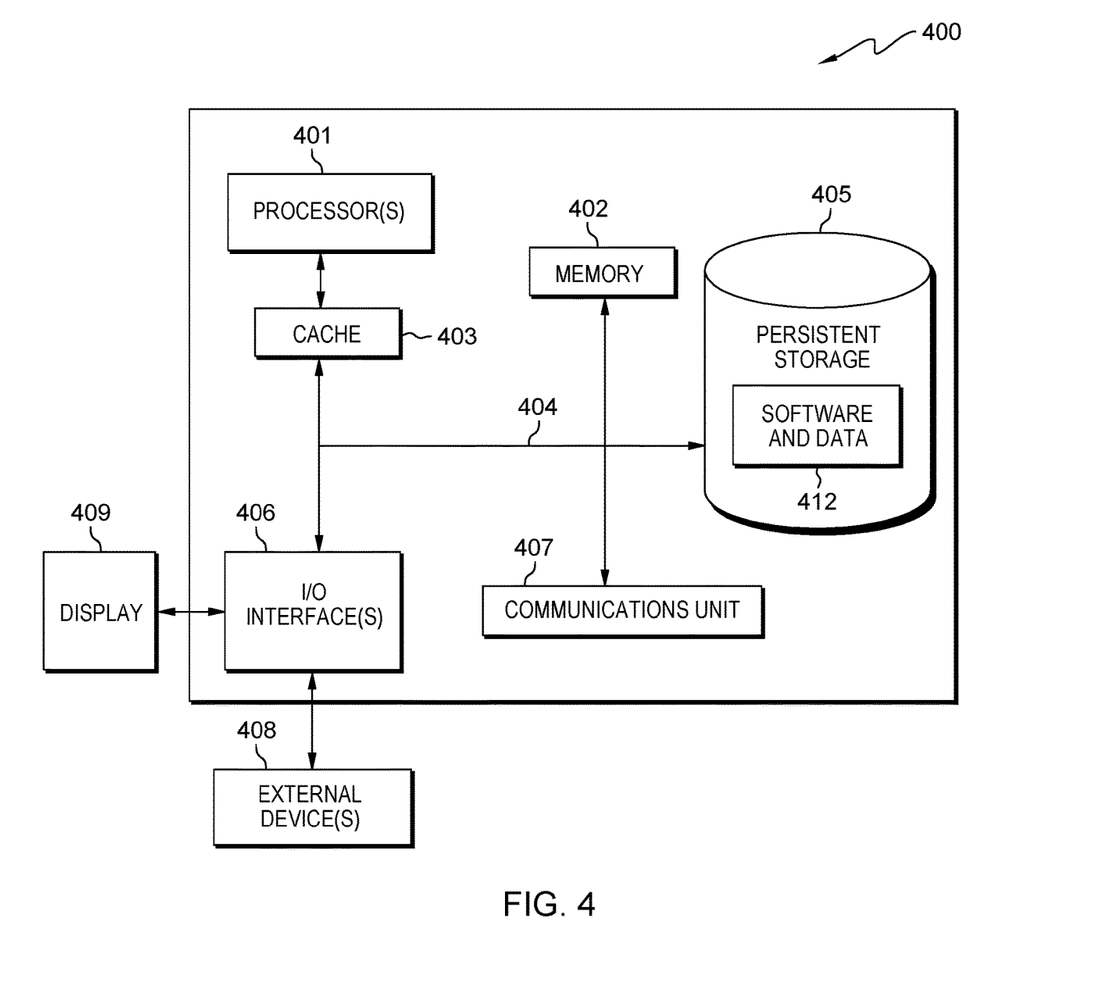
FIG. 4 is a block diagram of components of the server computer, in accordance with an embodiment of the present invention.

FIG. 4 depicts a block diagram of components of server computer 120 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server computer 120 each include communications fabric 404, which provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications, and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of computer processor(s) 401 by holding recently accessed data, and data near accessed data, from memory 402.

Program 150 may be stored in persistent storage 405 and in memory 402 for execution by one or more of the respective computer processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 412 can be stored in persistent storage 405 for access and/or execution by one or more of the respective processors 401 via cache 403.

Communications unit 407, in these examples, provides for communications with other data processing systems or devices. In these examples, communications unit 407 includes one or more network interface cards. Communications unit 407 may provide communications through the use of either or both physical and wireless communications links. Program 150 may be downloaded to persistent storage 405 through communications unit 407.

I/O interface(s) 406 allows for input and output of data with other devices that may be connected to server computer 120. For example, I/O interface(s) 406 may provide a connection to external device(s) 408, such as a keyboard, a keypad, a touch screen, and/or some other suitable input device. External devices 408 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 405 via PO interface(s) 406. I/O interface(s) 406 also connect to a display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q #, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG) illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
sampling, by one or more computer processors, a ratio lambda from a probability distribution based on a pair of datapoints contained in a dataset, wherein each datapoint in the pair of datapoints comprises an image and an associated caption;
extending, by one or more computer processors, the dataset by generating one or more new datapoints based on the sampled ratio lambda for each pair of datapoints in the dataset, wherein the one or more new datapoints is a third image and the sampled ratio lambda incorporates an interpolation of features associated with the pair of datapoints into the generated one or more new datapoints, comprising:
creating, by one or more computer processors, the third image comprising of one or more interpolated features associated with a first image and a second image by exchanging one or more features between the first image and the second image, utilizing the sampled ratio lambda;
identifying, by one or more computer processors, one or more objects contained within a subsequent image utilizing an image model trained utilizing the extended dataset; and
generating, by one or more computer processors, a third caption for one or more identified objects contained within the third image utilizing a language generating model trained utilizing the extended dataset, comprising:
creating, by one or more computer processors, the third caption comprising of one or more interpolated features associated with a first caption and a second caption by exchanging one or more features between the first caption and the second caption utilizing the sampled ratio lambda.

2. The method of claim 1, wherein the probability distribution is a beta distribution defined on an interval [0, 1].

3. The method of claim 1, wherein exchanging the one or more features between the first caption and the second caption, utilizing the sampled ratio lambda, to create the third caption comprising of the one or more interpolated features associated with the first caption and second caption further comprises:
utilizing, by one or more computer processors, a single word mixup process where each word in the first caption sentence is considered a distinct caption sentence and mixed with the second caption on a word by word basis.

4. The method of claim 1, further comprising:
generating, by one or more computer processors, one or more additional datapoints by applying color jittering, scale modifications, cropping, rotations, aspect ratio distortions, and flips to the one or more generated new datapoints.

5. The method of claim 1, wherein the image model is a convolutional neural network.

6. The method of claim 1, wherein the language generating model is a recurrent neural network.

7. The computer-implemented method of claim 1, wherein generating the third image and the third caption comprises mixup functions that include $\tilde{x}=\lambda x_i+(1-\lambda)x_j$ and $\tilde{y}=\lambda y_i+(1-\lambda)y_j$, wherein $\tilde{x}$ is a new image, $\tilde{y}$ is a new caption, x is an image matrix, y is a natural language caption, and $\lambda$ is the sampled ratio lambda.

8. A computer program product comprising:
one or more computer readable storage media and program instructions stored on the one or more computer readable storage media, the stored program instructions comprising:
program instructions to sample a ratio lambda from a probability distribution based on a pair of datapoints contained in a dataset, wherein each datapoint in the pair of datapoints comprises an image and an associated caption;
program instructions to extend the dataset by generating one or more new datapoints based on the sampled ratio lambda for each pair of datapoints in the dataset, wherein the one or more new datapoints is a third image and the sampled ratio lambda incorporates an interpolation of features associated with the pair of datapoints into the generated one or more new datapoints, comprising:
  program instructions to create the third image comprising of one or more interpolated features associated with a first image and a second image by exchanging one or more features between the first image and the second image, utilizing the sampled ratio lambda;
  program instructions to identify one or more objects contained within a subsequent image utilizing an image model trained utilizing the extended dataset; and
  program instructions to generate a third caption for one or more identified objects contained within the third image utilizing a language generating model trained utilizing the extended dataset, comprising:
    program instructions to create the third caption comprising of one or more interpolated features associated with a first caption and a second caption by exchanging one or more features between the first caption and the second caption utilizing the sampled ratio lambda.

9. The computer program product of claim 8, wherein the probability distribution is a beta distribution defined on an interval [0, 1].

10. The computer program product of claim 8, wherein the program instructions to extend the dataset by generating the one or more new datapoints based on applying the sampled ratio lambda for each pair of datapoints in the dataset, wherein the sampled ratio lambda incorporates the interpolation of features associated with the pair of datapoints into the generated one or more new datapoints further comprise:
  program instructions to utilize a single word mixup process where each word in the first caption sentence is considered a distinct caption sentence and mixed with the second caption on a word by word basis.

11. The computer program product of claim 8, wherein the image model is a convolutional neural network.

12. The computer program product of claim 8, wherein generating the third image and the third caption comprises mixup functions that include $\tilde{x}=\lambda x_i+(1-\lambda)y_i$ and $\tilde{y}=\lambda y_i+(1-\lambda)y_j$, wherein $\tilde{x}$ is a new image, $\tilde{y}$ is a new caption, x is an image matrix, y is a natural language caption, and $\lambda$ is the sampled ratio lambda.

13. A computer system comprising:
  one or more computer processors;
  one or more computer readable storage media; and
  program instructions stored on the computer readable storage media for execution by at least one of the one or more processors, the stored program instructions comprising:
    program instructions to sample a ratio lambda from a probability distribution based on a pair of datapoints contained in a dataset, wherein each datapoint in the pair of datapoints comprises an image and an associated caption;
    program instructions to extend the dataset by generating one or more new datapoints based on the sampled ratio lambda for each pair of datapoints in the dataset, wherein the one or more new datapoints is a third image and the sampled ratio lambda incorporates an interpolation of features associated with the pair of datapoints into the generated one or more new datapoints, comprising:
      program instructions to create the third image comprising of one or more interpolated features associated with a first image and a second image by exchanging one or more features between the first image and the second image, utilizing the sampled ratio lambda;
    program instructions to identify one or more objects contained within a subsequent image utilizing an image model trained utilizing the extended dataset; and
    program instructions to generate a third caption for one or more identified objects contained within the third image utilizing a language generating model trained utilizing the extended dataset, comprising:
      program instructions to create the third caption comprising of one or more interpolated features associated with a first caption and a second caption by exchanging one or more features between the first caption and the second caption utilizing the sampled ratio lambda.

14. The computer system of claim 13, wherein the probability distribution is a beta distribution defined on an interval [0, 1].

15. The computer system of claim 13, wherein the program instructions to extend the dataset by generating the one or more new datapoints based on applying the sampled ratio lambda for each pair of datapoints in the dataset, wherein the sampled ratio lambda incorporates the interpolation of features associated with the pair of datapoints into the generated one or more new datapoints further comprise:
  program instructions to utilize a single word mixup process where each word in the first caption sentence is considered a distinct caption sentence and mixed with the second caption on a word by word basis.

16. The computer system of claim 13, wherein the image model is a convolutional neural network.

17. The computer system of claim 13, wherein generating the third image and the third caption comprises mixup functions that include $\tilde{x}=\lambda x_i+(1-\lambda)x_j$, wherein $\tilde{x}$ is a new image, $\tilde{y}$ is a new caption, x is an image matrix, y is a natural language caption, and $\lambda$ is the sampled ratio lambda.

* * * * *